United States Patent
Jendbro

(10) Patent No.: US 7,574,170 B2
(45) Date of Patent: Aug. 11, 2009

(54) METHOD AND SYSTEM FOR IDENTIFYING SOURCES OF LOCATION RELEVANT CONTENT TO A USER OF A MOBILE RADIO TERMINAL

(75) Inventor: Magnus Jendbro, Staffanstorp (SE)

(73) Assignee: Sony Ericsson Mobile Communications AB, Lund (SE)

( * ) Notice: Subject to any disclaimer, the term of this patent is extended or adjusted under 35 U.S.C. 154(b) by 498 days.

(21) Appl. No.: 11/423,888

(22) Filed: Jun. 13, 2006

(65) Prior Publication Data

US 2007/0263069 A1    Nov. 15, 2007

Related U.S. Application Data

(60) Provisional application No. 60/747,136, filed on May 12, 2006.

(51) Int. Cl.
H04H 40/00 (2008.01)

(52) U.S. Cl. .................. 455/3.06; 455/3.01; 455/456.1

(58) Field of Classification Search ............... 455/3.01, 455/3.06, 404.2, 414.1, 456.1, 456.3, 457
See application file for complete search history.

(56) References Cited

U.S. PATENT DOCUMENTS

| | | | | |
|---|---|---|---|---|
| 6,405,033 B1 * | 6/2002 | Kennedy et al. | ......... | 455/414.1 |
| 6,684,157 B2 * | 1/2004 | Barman et al. | ............. | 701/213 |
| 6,898,434 B2 * | 5/2005 | Pradhan et al. | .......... | 455/456.1 |
| 7,421,243 B2 * | 9/2008 | Sato et al. | .................. | 455/3.01 |
| 2003/0092451 A1 | 5/2003 | Holloway et al. | | |
| 2003/0135324 A1 | 7/2003 | Navab | | |
| 2004/0052504 A1 * | 3/2004 | Yamada et al. | ................ | 386/68 |
| 2004/0054732 A1 | 3/2004 | Carter et al. | | |
| 2004/0203746 A1 | 10/2004 | Knauerhase et al. | | |
| 2005/0039136 A1 | 2/2005 | Othmer | | |
| 2005/0086334 A1 * | 4/2005 | Aaltonen et al. | ............ | 709/223 |
| 2005/0096069 A1 | 5/2005 | Lee | | |
| 2005/0188403 A1 | 8/2005 | Kotzin | | |
| 2007/0035388 A1 * | 2/2007 | Mock et al. | ................. | 340/505 |
| 2007/0094351 A1 | 4/2007 | Kalish et al. | | |

FOREIGN PATENT DOCUMENTS

| | | |
|---|---|---|
| EP | 1 526 749 A2 | 4/2005 |
| WO | 02/102025 A1 | 12/2002 |
| WO | 2004/040923 A1 | 5/2004 |

OTHER PUBLICATIONS

International Preliminary Report on Patentability from corresponding International Application No. PCT/IB06/003143.
Agre et al. "A Layered Architecture for Location-based Services in Wireless Ad Hoc Networks." IEEE, 2002, pp. 1085-1097.

(Continued)

*Primary Examiner*—CongVan Tran
(74) *Attorney, Agent, or Firm*—Renner, Otto, Boisselle & Sklar, LLP

(57) ABSTRACT

A method of identifying sources of location relevant content to a user of mobile radio terminal. The method includes determining a location of the mobile radio terminal; determining content sources for which audiovisual content having relevancy to the identified location may be transmitted to the mobile radio terminal for playback; and identifying the determined content sources to the user.

16 Claims, 2 Drawing Sheets

OTHER PUBLICATIONS

Schilit et al. "Disseminating Active Map Information to Mobile Hosts." IEEE Network, 1994, pp. 22-32.

Delivering and Playing Windows Media Content on Mobile Devices, Microsoft Corporation, Jul. 2005, 21 pages.

International Preliminary Report on Patentability from corresponding International Application No. PCT/US06/28261.

Office Action from corresponding U.S. Appl. No. 11/298,790, Rejection on Jun. 5, 2008.

\* cited by examiner

US 7,574,170 B2

METHOD AND SYSTEM FOR IDENTIFYING SOURCES OF LOCATION RELEVANT CONTENT TO A USER OF A MOBILE RADIO TERMINAL

RELATED APPLICATION DATA

The present application claims the benefit of U.S. Provisional Application Ser. No. 60/747,136, filed May 12, 2006, the disclosure of which is herein incorporated by reference in its entirety.

TECHNICAL FIELD OF THE INVENTION

The present invention relates generally to electronic equipment, such as electronic equipment for engaging in voice communications and/or for playing back audiovisual content to a user. More particularly, the invention relates to a method and system for identifying location relevant content to a user of a mobile radio terminal.

DESCRIPTION OF THE RELATED ART

Mobile and/or wireless items of electronic equipment are becoming increasingly popular. For example, mobile telephones are now in wide-spread use. In addition, the features associated with certain types of electronic equipment have become increasingly diverse. To name a few examples, many electronic equipment include cameras, text messaging capability, Internet browsing functionality, electronic mail capability, video playback capability, audio playback capability, image display capability and hands-free headset interfaces.

Some items of electronic equipment include mobile television and/or mobile radio capability. For example, mobile items of electronic equipment may be able to receive and display video content, along with outputting associated audio content. For instance, such electronic equipment may be compatible with the Digital Video Broadcasting-Handheld (DVB-H) standard for bringing broadcast services to handheld receivers. DVB-H can offer a downstream channel (e.g., a television channel or radio channel) at high data rates for use by standalone devices or as an enhancement to mobile telecommunications networks. Audiovisual content also may be delivered through other techniques, such as a podcast delivered to the device in a feed format. Exemplary feed formats are really simple syndication (RSS) or Atom syndication. It is noted that RSS may equally refer to other podcasting standards, such as rich site summary (RSS 0.91), resource description framework (RDF) site summary (RSS 0.9 and 1.0) and real-time simple syndication (RSS 2.0).

Due to the inherent nature of mobile items of electronic equipment, the location of the electronic equipment may change. Location may change by relatively small geographical distances, such as when the user of the electronic equipment travels within a city or localized region (e.g., between a work location and a residence location). Location also may by relatively large geographical distances and/or to a place where available content may have substantial differences to the originating location, such as when the user travels to another city, into another country and so forth.

Certain content may have more relevance to a user when the user is in a particular location and less relevance when the user is not in that location. For example, weather reports and local news services may have greater relevance when present in a corresponding location or if one is planning to travel to that location. However, the user may be unfamiliar with what location relevant content may be available and/or lack sufficient information as to how to retrieve or tune to the content.

SUMMARY

According to one aspect of the invention, a method of identifying sources of location relevant content to a user of mobile radio terminal includes determining a location of the mobile radio terminal; determining content sources for which audiovisual content having relevancy to the identified location may be transmitted to the mobile radio terminal for playback; and identifying the determined content sources to the user.

According to another aspect of the invention, a method of identifying sources of location relevant content to a user of mobile radio terminal includes determining a present or planned location of the mobile radio terminal; determining content sources from which audiovisual content having relevancy to the determined location may be transmitted to the mobile radio terminal for playback; and pushing the identities of the determined content sources to the user automatically after the determination.

According to an embodiment of the method, the determining the location and the determining of content sources are carried out in response to travel of the mobile radio terminal to a present location from a different location.

According to an embodiment of the method, the sources include at least one of a podcast, a mobile television channel or a mobile radio channel.

According to an embodiment of the method, the determining of content sources is made by a server and the pushing the identities of the determined content sources includes transmitting identities of the determined sources to the mobile radio terminal in a feed format.

According to an embodiment of the method, the feed format is an RSS push.

According to an embodiment, the method further includes displaying the identities of the determined sources to the user.

According to an embodiment, the method further includes, upon user selection of one of the determined sources, transmitting content corresponding to the selected source to the mobile radio terminal for playback.

According to an embodiment of the method, the mobile radio terminal is a mobile telephone.

According to an embodiment of the method, the determining of content sources includes searching sources of content that are available to the mobile radio terminal under a user subscription with an operator of a communications network servicing the mobile radio terminal and that are available in the location.

According to another aspect of the invention, a program stored on a machine usable medium for identifying sources of location relevant content to a user of mobile radio terminal includes executable logic to determine a present or planned location of the mobile radio terminal; determine content sources from which audiovisual content having relevancy to the determined location may be transmitted to the mobile radio terminal for playback; and pushing the identities of the determined content sources to the user automatically after the determination.

According to an embodiment of the program, the logic to determine the location and the logic to determine the content sources are executed in response to travel of the mobile radio terminal to a present location from a different location.

According to an embodiment of the program, the sources include at least one of a podcast, a mobile television channel or a mobile radio channel.

According to an embodiment of the program, the logic to determine the content sources is executed by a server and the logic to push the identities of the determined content sources includes logic to transmit identities of the determined sources to the mobile radio terminal in a feed format.

According to an embodiment of the program, the feed format is an RSS push.

According to an embodiment of the program, upon user selection of one of the determined sources, executing logic to transmit content corresponding to the selected source to the mobile radio terminal for playback.

According to an embodiment of the program, the mobile radio terminal is a mobile telephone.

According to an embodiment of the program, the logic to determine the content sources includes logic to search sources of content that are available to the mobile radio terminal under a user subscription with an operator of a communications network servicing the mobile radio terminal and that are available in the location.

According to yet another aspect of the invention, a server configured to identify sources of location relevant content to a user of mobile radio terminal executes logic to determine a present or planned location of the mobile radio terminal; determine content sources from which audiovisual content having relevancy to the determined location may be transmitted to the mobile radio terminal for playback; and push the identities of the determined content sources to the mobile radio terminal automatically after the determination.

According to an embodiment of the server, the logic to determine the location and the logic to determine the content sources are executed in response to travel of the mobile radio terminal to a present location from a different location.

According to an embodiment of the server, the identities of the determined content sources are pushed in an RSS feed format.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
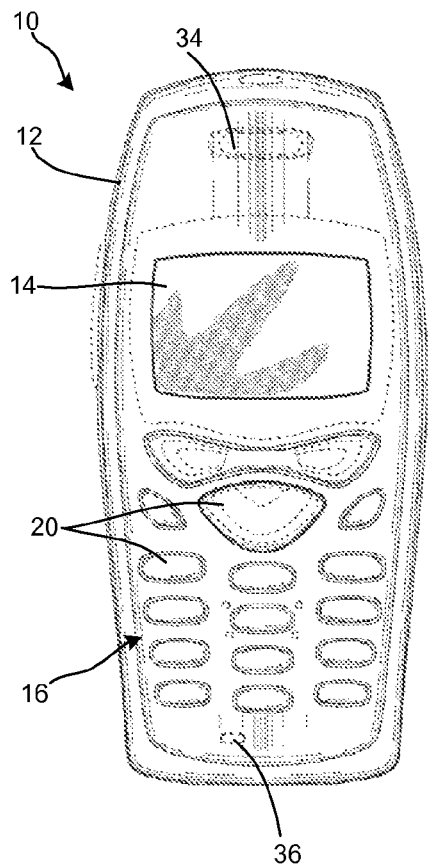
FIG. 1 is a schematic view of a mobile telephone as an exemplary electronic equipment in accordance with an embodiment of the present invention.

The present invention will now be described with reference to the drawings, wherein like reference numerals are used to refer to like elements throughout.

The term "electronic equipment" includes portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like. Other exemplary electronic equipment and mobile radio terminals may include, but are not limited to, portable media players, media jukeboxes and similar devices having a radio transceiver.

In the present application, the invention is described primarily in the context of a mobile telephone. However, it will be appreciated that the invention is not intended to be limited to a mobile telephone and can be any type of electronic equipment.

The term channel will be used to broadly mean any one of multiple broadcast services that may be received by the electronic equipment. Accordingly, each channel may correspond to a television station or a radio station. Channels may also correspond to a set of programs offered by a television, video, radio, music and/or other content service (e.g., there may be one service provider that offers a number of programs, such as in the form of a play list). As will be appreciated, each channel delivers corresponding audiovisual content. The content may change over the course of time (e.g., a news program may be followed by a sporting event, which is followed by movie). A receiver (e.g., a DVB-H receiver) of the electronic equipment 10 may be "tuned" to one of the channels. It is noted that under the DVB-H standard, each channel may be referred to as a service. The channel to which the receiver is tuned is typically selected by the user.

Audiovisual content may be received by the electronic equipment in other manners, such as by podcasts. Accordingly, media content and the identification of location relevant media content may relate to any mobile media format including, but not limited to, mobile television, mobile radio, internet radio and/or audiovisual channels, podcasts, video clips, audio clips, audio books, animations, ring tones, commercials, advertisements, coupons and so forth.

Referring initially to FIG. 1, an electronic equipment 10 is shown in accordance with the present invention. The electronic equipment includes a content source identification function that is configured to provide a user with the identity of a source of media content having relevancy to the present location of electronic equipment or a planned location of the electronic equipment. It will be appreciated that the content source identification function may be embodied as executable code that may be resident in and executed by the electronic equipment 10. In other embodiments, as will be described in greater detail below, the content source identification function (or portions of the function) may be resident in and executed by a server or device separate from the electronic equipment 10.

The electronic equipment in the exemplary embodiment is a mobile telephone and will be referred to as the mobile telephone 10. The mobile telephone 10 is shown as having a "brick" or "block" form factor housing 12, but it will be appreciated that other type housings, such as a clamshell housing or a slide-type housing, may be utilized.

The mobile telephone 10 includes a display 14 and keypad 16. As is conventional, the display 14 displays information to a user such as operating state, time, telephone numbers, contact information, various navigational menus, etc., which enable the user to utilize the various feature of the mobile telephone 10. The display 14 may also be used to visually display content received by the mobile telephone 10 and/or retrieved from a memory 18 (FIG. 2) of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc.

Figure 2:
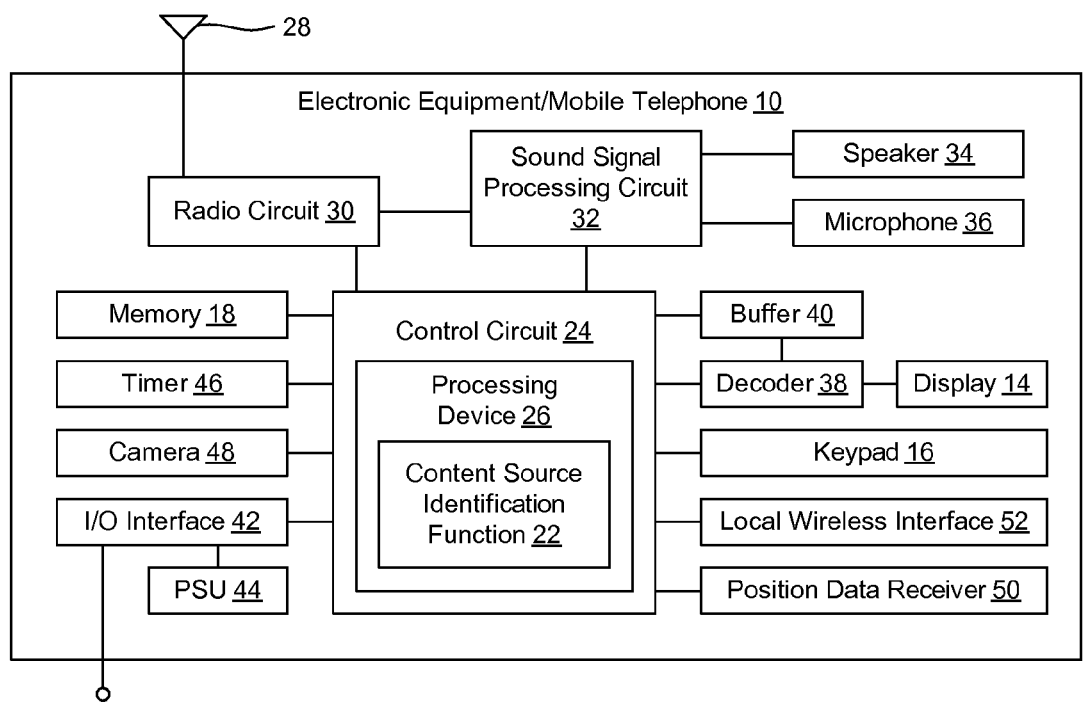
FIG. 2 is a schematic block diagram of the relevant portions of the mobile telephone of FIG. 1 in accordance with an embodiment of the present invention.

FIG. 2 represents a functional block diagram of the mobile telephone 10. With the exception of a content source identification function 22, which is preferably implemented as executable logic in the form of application software or code within the mobile telephone 10, the construction of the mobile telephone 10 is otherwise generally conventional. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out conventional operation of the mobile telephone 10. The memory 18 may be, for example, one or more of a buffer, a flash memory, a hard drive, a removable media, a volatile memory, a non-volatile memory or other suitable device. In addition, the processing device 26 executes code in order to perform the content source identification function 22.

It will be apparent to a person having ordinary skill in the art of computer programming, and specifically in applications programming for mobile telephones or other items of electronic equipment, how to program a mobile telephone 10 to operate and carry out the functions described herein. Accordingly, details as to the specific programming code have been left out for sake of brevity. Also, while the content source identification function 22 is executed by the processing device 26 in accordance with the preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system, as well as to receive audiovisual content. For example, the receiver may be an IP datacast compatible receiver compatible with a hybrid network structure providing mobile communications and DVB-H based or similar services. Other receivers for interaction with a mobile radio network or broadcasting network are possible and include, for example, GSM, CDMA, WCDMA, MBMS, WiFi, WiMax, DVB-H, ISDB-T, etc.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18, derived from an incoming video data stream received by the radio circuit 30 or obtained by any other suitable method. Prior to being feed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown). Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, hands-free adaptor, another mobile radio terminal, computer or other device.

The mobile telephone 10 may be configured to transmit, receive and process data, such as text messages (e.g., a short message service (SMS) formatted message), electronic mail messages, multimedia messages (e.g., a multimedia messaging service (MMS) formatted message), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, broadcasting audio sounds associated with the data and so forth.

Figure 3:
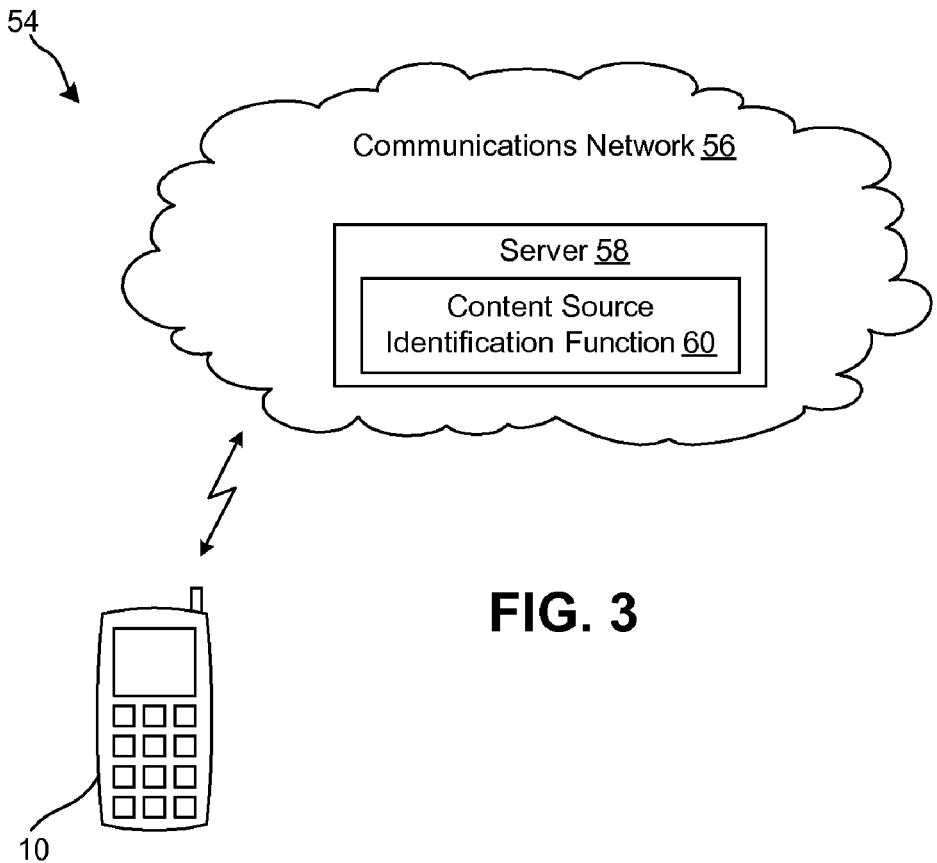
FIG. 3 is a schematic diagram of a communications system in which the mobile telephone of FIG. 1 may operate.

With additional reference to FIG. 3, the mobile telephone 10 may be configured to operate as part of a communications system 54. The system 54 may include a communications network 56 having a server 58 (or servers) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways. The network 56 may support the communications activity of multiple mobile telephones 10, although only one mobile telephone 10 is shown in the illustration of FIG. 3.

In one embodiment, the server 58 may operate in stand alone configuration relative to other servers of the network 52 or may be configured to carry out multiple communications network 58 functions. As will be appreciated, the server 58 may be configured as a typical computer system used carry out server functions and may include a processor configured to execute software containing logical instructions that embody the functions of the server 58. Those functions may include the content source identification function in an embodiment where the content source identification function 22 is not carried out by the mobile telephone 10 or is partially carried out by the mobile telephone 10 and/or where the server functions are complimentary to the operation of the content source identification function 22 of the mobile telephone 10, and will be collectively referred to as a content source identification function 60.

Figure 4:
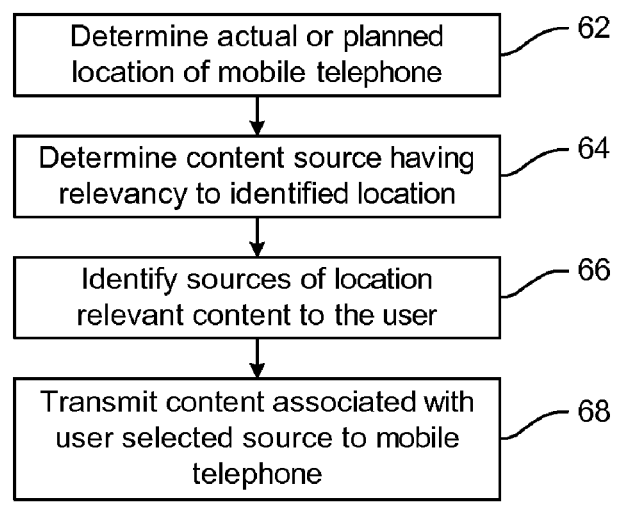
FIG. 4 is a flow chart of an exemplary content source identification function in accordance with the present invention.

Referring to FIG. 4, a method of identifying sources of location relevant content and/or the location relevant content itself to a user of the mobile telephone 10 is depicted. It will be appreciated that the method may be adapted to identify sources of location relevant content no matter the format of the content or the delivery mechanism (e.g., mobile television, podcasts, etc.). Portions of the functionality of the method may be carried out by the mobile telephone 10 and portions of the functionality of the method may be carried out by the server 58. For example, the functionality of the method may be embodied as executable code, such as in the form of the content source identification function 22 and/or the content source identification function 60, or any other suitable form, including software, firmware, dedicated circuit components, a program stored on a computer readable media or in machine usable medium, and so forth.

Although the illustrated method shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The method may begin in block 62 where a location for the mobile telephone 10 is determined. The location that is determined in block 62 may be the actual (or current) location of the mobile telephone 10 or a future, planned location of the mobile telephone.

The current location of the mobile telephone 10 may be determined using any appropriate positioning technology. For instance, the location determination mechanism may include accessing an identity of a communications access point (e.g., communications tower) servicing the mobile telephone 10. In one embodiment, the communications tower may be part of a cellular network (e.g., a "cell" tower) that has an associated identifier (e.g., "cell ID") and the identifier is communicated to the mobile telephone 10 or the server 58 as an identifier or position. Each identifier or cell ID in a particular servicing network may be assumed to be unique and, therefore, may be used to indicate relative proximity to a certain location. In one embodiment, the cell ID and any related radio parameters may be used to generate a coordinate value through a radio network service. For example, under global system mobile communications (GSM) and universal mobile telecommunications system (UMTS) protocols, the position could be estimated through a mobile originated location request (MO-LR) to the network so that the mobile telephone 10 position could be estimated using the network's knowledge of tower locations and antenna directions. In other embodiments, location information may be determined by receipt of location data from a dedicated system, such as a global positioning satellite (GPS), Galileo satellite system or the like. Such data may be received via the position data receiver 50, if present as part of the mobile telephone 10. For instance, GPS coordinates may be expressed using a standard reference system (e.g., the world geodetic system or WGS).

The current position or planned position of the mobile telephone 10 may be determined by user specification. In will be recognized that the planned position need not be a location to which the user and/or mobile telephone 10 actually travels, but could simply be a place of interest to the user. In one embodiment, for purposes of location determination in block 62, the location may be specified by reference to a landmark, a city name, an airport name or code, and so forth. Menus of location choices may be provided for this purpose or the location may be manually entered. As will become more apparent below, allowing the specification of a planned location or location of interest in addition to a current location may assist the user in finding content having relevancy to those locations. Such content may, in turn, assist the user in planning a trip (e.g., select appropriate clothing for the local weather, find a restaurant or hotel, etc.), view local news or events, and so forth.

Determining the location in block 62 and, hence, initiation of the illustrated method, may be prompted in response to one or more of several conditions. For example, the user may subscribe to service to have sources of location relevant content identified on a periodic basis or the user may have configured settings of the mobile telephone 10 to have sources of location relevant content identified on a periodic basis. As another example, the method may be automatically initiated when the mobile telephone 10 enters a new location (e.g., connectivity is made to the communications network 56 outside the user's primary service location or outside an immediately previous connectivity location). As another example, the method may be initiated by the user, such as by commanding a request for sources of location relevant content.

Following block 62, the method may proceed to block 64 where sources having content that relates to the location of block 62 may be identified. The determination of block 64 may be carried out, for example, by searching through sources of content that are available to the user under the user's subscription with the operator of the communications network 56 and offered in the location identified in block 62. In situations were the location identified in block 62 is not the current location of the mobile telephone 10, the search may be made for sources of content that are available to the user under the user's subscription with the operator of the communication network 56 and offered in the current location of the mobile telephone 10, but having relevancy for the location identified in block 62.

To assist in such a search, each source and/or content item may be tagged to indicate whether the source or content has local applicability. In addition, the nature of the local applicability may be identified, such as being applicable to weather reports, news, sports, events, etc. During such as search, the sources may be filtered to include sources that has content relating to a fairly specific location, such as an airport or city neighborhood, or to include sources that has content relating to a broader location, such as an entire city or region.

Other filters may be applied based on specified interests of the user or predetermined categories. An exemplary list of categories may include local news, local sports teams, local weather, local music, local traffic, local travel planning, local events, local retail stores, local restaurants and so forth. For instance, the source may be focused on travel, such as a travel guide, an airport guide or coach, a city guide, and so forth. The content may be, for example, local weather, traffic, news or other information offered by a channel or podcast. The content may be advertisements, coupons, list of stores or services for the location or other commercial content for a certain location, such as a shopping mall, airport or sports arena.

In one embodiment, the sources subject to the determination made in block 64 include mobile television channels, mobile radio channels, podcasts and other content delivery platforms for audiovisual content delivery that may have a relationship to the location determined in block 62. The determination of block 64 may be made for content across all time slots, for content aired only at the current time, for content aired at a specific time selected by the user and so forth.

Thereafter, in block 66, the identity of the content source or sources that were determined in block 64 as having relevancy to the location may be identified to the user, such as presenting the sources on the display 14 as part of an interactive presentation (e.g., graphical user interface or GUI). For instance, the sources may be presented in a list, as part of a menu or in the form of selectable links, the selection of which may result in the access of the corresponding content. In an embodiment where the sources are identified by the server 58, the identity of the sources may be pushed to the mobile telephone 10. Delivery of the identity of the sources may be accomplished by any suitable technique including an RSS feed, SMS, MMS and so forth. In other embodiments, the underlying content itself may be delivered to the mobile telephone 10.

Upon being presented with the identity of the sources of location relevant content, the user may select one or more of those sources for playback. Upon such a selection, the associated content may be transmitted to or downloaded by the mobile telephone 10 in block 68. If the source is a mobile television channel, the selection may result in the tuning of the receiver (e.g., radio circuit 30) to the appropriate channel. If the source requires a subscription to obtain content from the source, the user may complete the subscription process before receiving the content.

As will be appreciated, the method may be carried out to identify sources of audiovisual content having a relationship to a particular location. The method may be embodied as a service offered to a user to provide a link or other feed (e.g., RSS feed) of location relevant sources to the mobile radio terminal. The data may be pushed to the mobile radio terminal based on the location of the user. For example, if the user were to travel to a location, such as an airport or city outside the user's primary service area, channels and/or podcasts having location relevant content (e.g., a travel guide, weather channel, advertisements, etc.) may be pushed to the mobile radio terminal and/or identified to the mobile radio terminal. The location of the mobile radio terminal, or change in location, may be determined by any suitable positioning technology, such as cell ID or GPS. From the pushed data (e.g., podcasts) or available channels (e.g., DVB-H channels), the user may choose one or more content sources for playback.

Although the invention has been shown and described with respect to certain embodiments, it is understood that equivalents and modifications will occur to others skilled in the art upon the reading and understanding of the specification. The present invention includes all such equivalents and modifications, and is limited only by the scope of the following claims.

What is claimed is:

1. A method of identifying broadcast services associated with location relevant content to a user of mobile radio terminal, comprising:
   determining a present location of the mobile radio terminal;
   determining broadcast service sources from which audiovisual content having relevancy to the determined location may be transmitted to the mobile radio terminal for playback; and
   pushing the identities of the determined broadcast service sources to the mobile radio terminal automatically after the determination, wherein each identified broadcast service is associated with at least one of a podcast, a mobile television channel or a mobile radio channel such that the pushed identities collectively identify plural sources of broadcast services for audiovisual content having relevancy to the determined location in a user interactive presentation; and
   wherein the determining of broadcast service sources is made by a server and the pushing the identities of the determined broadcast service sources includes transmitting identities of the determined sources to the mobile radio terminal in a feed format.

2. The method of claim 1, wherein the determining the location and the determining of broadcast service sources are carried out in response to travel of the mobile radio terminal to a present location from a different location.

3. The method of claim 1, wherein the feed format is an RSS push.

4. The method of claim 1, further comprising displaying the interactive presentation to the user.

5. The method of claim 1, upon user selection of one of the determined sources, further comprising transmitting content corresponding to the selected source to the mobile radio terminal for playback.

6. The method of claim 1, wherein the mobile radio terminal is a mobile telephone.

7. The method of claim 1, wherein the determining of broadcast service sources includes searching sources of content that are available to the mobile radio terminal under a user subscription with an operator of a communications network servicing the mobile radio terminal and that are available in the location.

8. The method of claim 1, wherein the interactive presentation is one of a menu or selectable links.

9. The method of claim 1, further comprising filtering the determined broadcast service sources based on content category, the content category selected from news, sports, weather, music, traffic, travel, events, shopping, dining and combinations thereof.

10. A server configured to identify broadcast services associated with location relevant content to a user of mobile radio terminal, the server comprising a memory to store executable logic and a processor to execute the logic, wherein executing the logic:
   determines a present location of the mobile radio terminal;
   determine broadcast service sources from which audiovisual content having relevancy to the determined location may be transmitted to the mobile radio terminal for playback; and
   push the identities of the determined broadcast service sources to the mobile radio terminal automatically after the determination, wherein each identified broadcast service is associated with at least one of a podcast, a mobile television channel or a mobile radio channel such that the pushed identities collectively identify plural sources of broadcast services for audiovisual content having relevancy to the determined location in a user interactive presentation; and
   wherein the identities of the determined broadcast service sources are pushed in an RSS feed format.

11. The server of claim 10, wherein the logic to determine the location and the logic to determine the broadcast service sources are executed in response to travel of the mobile radio terminal to a present location from a different location.

12. The server of claim 10, wherein to determine the broadcast service sources, the executable logic searches sources of content that are available to the mobile radio terminal under a user subscription with an operator of a communications network servicing the mobile radio terminal and that are available in the location.

13. The server of claim 10, wherein the interactive presentation is one of a menu or selectable links.

14. The server of claim 10, wherein the executable logic filters the determined broadcast service sources based on content category, the content category selected from news, sports, weather, music, traffic, travel, events, shopping, dining and combinations thereof.

15. A method of identifying broadcast services associated with location relevant content to a user of mobile radio terminal, comprising:
   determining a present location of the mobile radio terminal;
   determining broadcast service sources from which audiovisual content having relevancy to the determined location may be transmitted to the mobile radio terminal for playback; and
   pushing the identities of the determined broadcast service sources to the mobile radio terminal automatically after the determination, wherein each identified broadcast service is associated with at least one of a podcast, a mobile television channel or a mobile radio channel such that the pushed identities collectively identify plural sources of broadcast services for audiovisual content having relevancy to the determined location in a user interactive presentation; and
   wherein the determining of broadcast service sources includes searching sources of content that are available to the mobile radio terminal under a user subscription with an operator of a communications network servicing the mobile radio terminal and that are available in the location.

16. A server configured to identify broadcast services associated with location relevant content to a user of mobile radio terminal, the server comprising a memory to store executable logic and a processor to execute the logic, wherein executing the logic:
   determines a present location of the mobile radio terminal;
   determine broadcast service sources from which audiovisual content having relevancy to the determined location may be transmitted to the mobile radio terminal for playback; and
   push the identities of the determined broadcast service sources to the mobile radio terminal automatically after the determination, wherein each identified broadcast service is associated with at least one of a podcast, a mobile television channel or a mobile radio channel such that the pushed identities collectively identify plural sources of broadcast services for audiovisual content having relevancy to the determined location in a user interactive presentation; and
   wherein to determine the broadcast service sources, the executable logic searches sources of content that are available to the mobile radio terminal under a user subscription with an operator of a communications network servicing the mobile radio terminal and that are available in the location.

* * * * *

UNITED STATES PATENT AND TRADEMARK OFFICE
CERTIFICATE OF CORRECTION

| | | |
|---|---|---|
| PATENT NO. | : 7,574,170 B2 | Page 1 of 1 |
| APPLICATION NO. | : 11/423888 | |
| DATED | : August 11, 2009 | |
| INVENTOR(S) | : Magnus Jendbro | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Seventh Day of September, 2010

David J. Kappos
*Director of the United States Patent and Trademark Office*